Dec. 5, 1961  J. P. RUSSELL  3,011,369
EXTENSION GUIDE FOR DRILLS
Filed Nov. 18, 1960  2 Sheets-Sheet 1
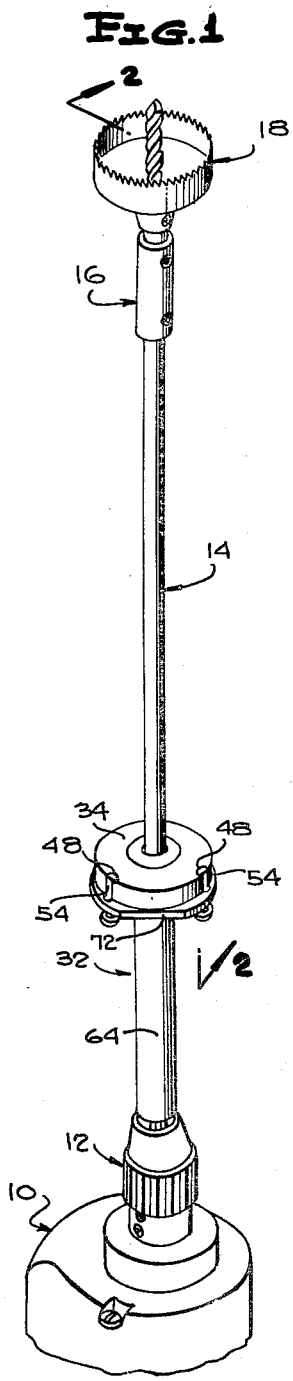
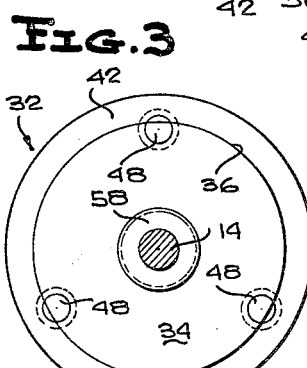
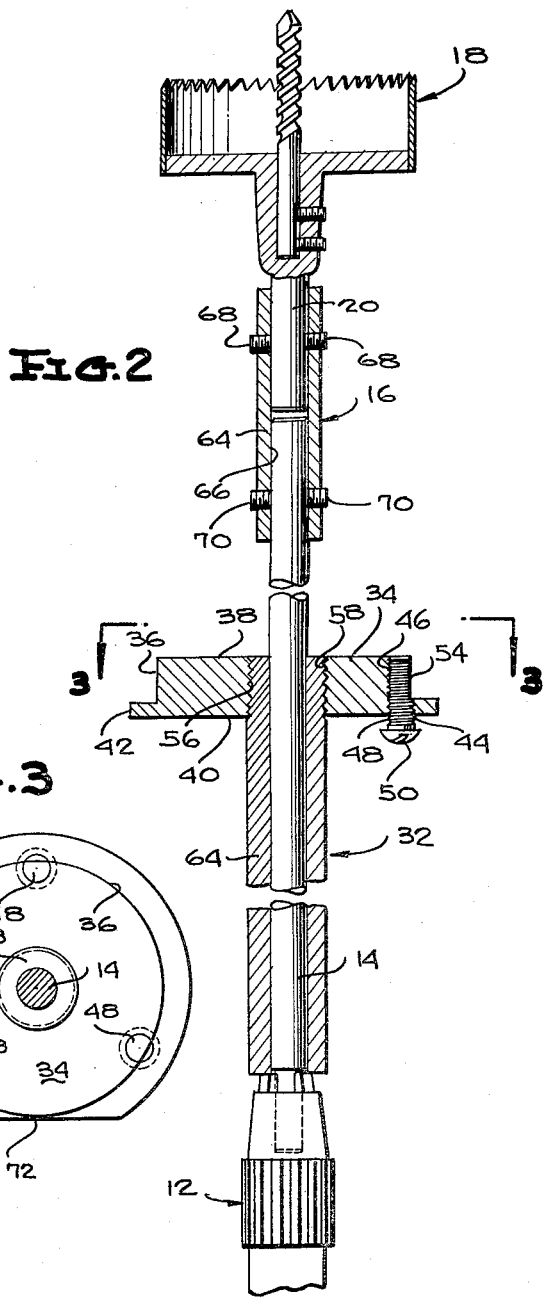
INVENTOR.
JOHN P. RUSSELL
BY
McMorrow, Berman & Davidson
ATTORNEYS

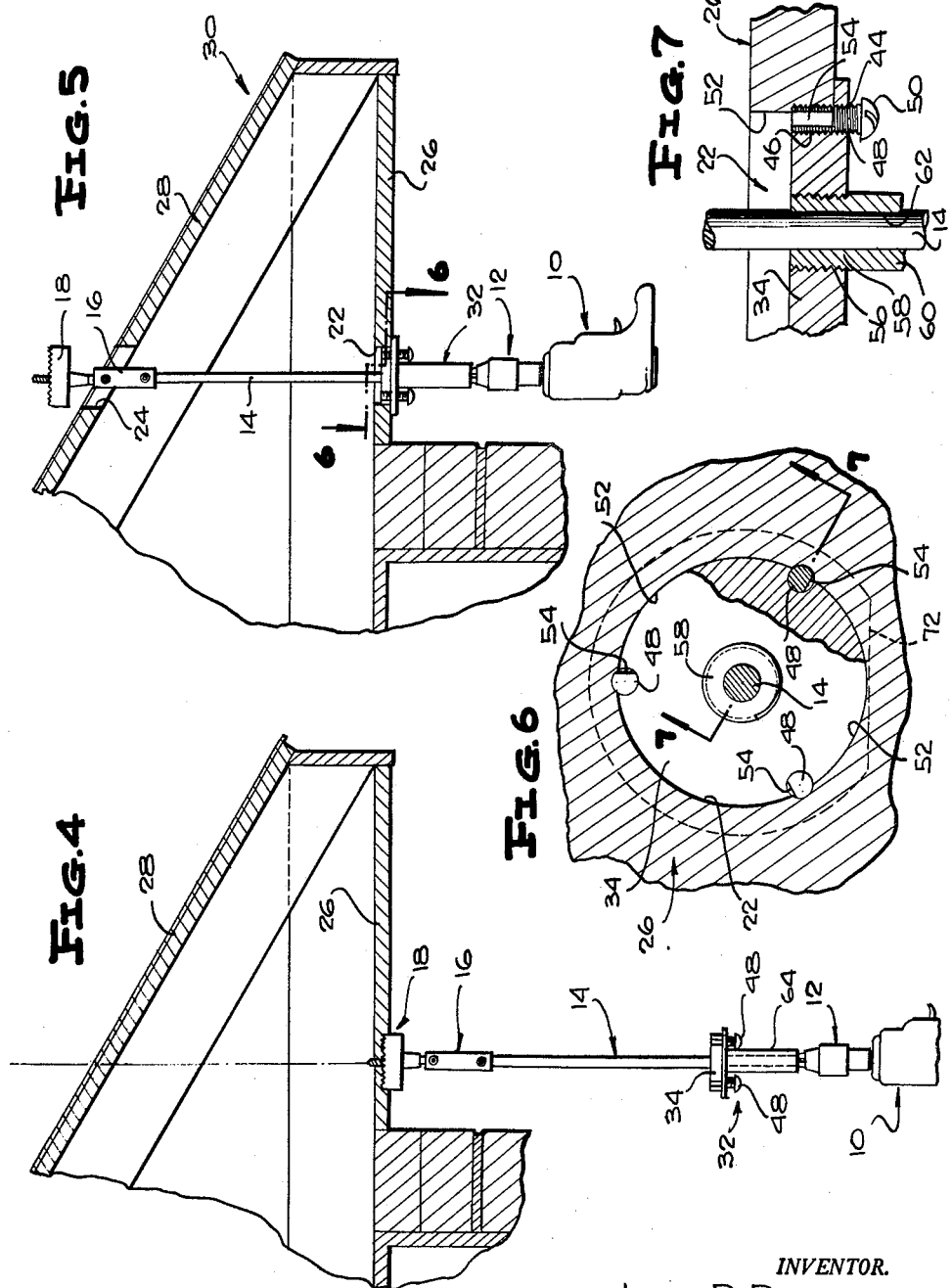

United States Patent Office 3,011,369
Patented Dec. 5, 1961

3,011,369
EXTENSION GUIDE FOR DRILLS
John P. Russell, 734 Keokuk Court, Iowa City, Iowa
Filed Nov. 18, 1960, Ser. No. 70,291
7 Claims. (Cl. 77—7)

This invention relates to a novel combination guide for portable drills.

The primary object of the invention is the provision of a simple, efficient, and easily used guide of the kind indicated for use where aligned holes, larger in diameter than the shaft of a drill, are to be drilled through two spaced objects, with such as a hole saw, the guide being adapted to be moved along the drill shaft and securably engaged in the hole first drilled so as then to serve to maintain the drill shaft centered and aligned with the first hole, as the second hole is drilled.

Another object of the invention is the provision of an extension guide of the character indicated above, which has simple and easily operated cam means, engageable with the edge of a drilled hole, for securing the guide temporarily in the hole, while a second hole is being drilled.

A further object of the invention is the provision of a guide of the character indicated above which requires no alteration or other encumbrance of a drill, and which is composed of a small number of simple and easily assembled parts, and which can be made in rugged and serviceable form at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a side elevation portion of a portable electric drill having an extension shaft chucked therein, on which a hole saw is coupled, showing an extension guide of the present invention engaged on the shaft;

FIGURE 2 is an enlarged and contracted longitudinal section taken on the line 2—2 of FIGURE 1;

FIGURE 3 is a horizontal section taken on the line 3—3 of FIGURE 2;

FIGURE 4 is a schematic view, partly in section, showing the hole saw applied to the underside of the horizontal bottom panel of a building roof overhang, with the extension guide in depressed retracted position;

FIGURE 5 is a view like FIGURE 4, showing the extension guide secured in the hole drilled in the bottom panel and the hole saw passed upwardly through the second hole drilled in the sloping upper panel of the overhang;

FIGURE 6 is an enlarged fragmentary horizontal section, with parts broken away, taken on the line 6—6 of FIGURE 5, and showing the came in operative engagement with the edge of a hole in which the extension guide is engaged; and, FIGURE 7 is a fragmentary vertical transverse section taken on the line 7—7 of FIGURE 6.

Referring in detail to the drawings, wherein like numerals designate like parts throughout the several views, there is shown a conventional portable electric drill 10, having a chuck 12, in which the inner end of an extension shaft 14 is secured, an auxiliary chuck or coupling 16 secured on the outer end of the shaft 14, and a hole saw 18, having a bit or stem 20 secured in the coupling. The hole saw 18, being larger in diameter than the extension shaft 14, represents, in the concept of the present invention, any drilling or boring bit which is larger in diameter than the shaft 14.

In contemplation of drilling aligned first and second holes 22 and 24, in such as the horizontal bottom panel 26 and in the sloping top panel 28, of such as a building roof overhang 30, with the axes of these holes perpendicular to the bottom panel 26, there is slidably and rotatably engaged on the extension shaft 14, an extension guide of the present invention.

The extension guide, generally designated 32, comprises a flat circular disc or plate 34, preferably solid and of substantial thickness, which is of substantially the same diameter as the first hole, and has a peripheral edge 36. The plate 34 has preferably flat parallel upper and lower surfaces 38 and 40, respectively, and is formed, on its peripheral edge, with a lateral annular stop flange 42, which is spaced downwardly from the upper surface 38, and is preferably flush with the lower surface 40.

At equally circumferentially spaced intervals around the disc 34, one threaded full bore 44, formed partly in the flange 42 and in the disc 34, which open, at their upper ends, into half-bores 46, which open laterally outwardly through the peripheral edge 36 of the disc 34. The half-bores 46 are slightly more than half-cylindrical. Threaded upwardly through the full bores 44 and into the half-bores 46, are cam screws 48 having slotted heads 50 on their lower ends, whereby portions of the screws project laterally outwardly beyond the peripheral edge 36 of the disc, for forcible cam engagement with the edge 52 of the lower panel hole 22, as shown in FIGURES 6 and 7, whereby the guide 32 is secured in the hole 22, with the stop flange 42 engaged with the underside of the panel 26. One side of the screws is reduced and flattened, as indicated at 54, to provide for clearance with the hole edge 52, when the screws are rotated to put the flats 54 substantially flush with the peripheral edge 36, in inserting and removing the disc 34 from the hole 22.

The disc 34 is formed with a central threaded bore 56 which receives the threaded upper end portion 58 of a guide sleeve 60 of relatively large cross section, but smaller in diameter than the hole saw 18, which has a smooth axial bore 62 which slidably and rotatably receives the extension drill shaft 14. The sleeve 60 not only precludes vibration and binding of the extension shaft 14, but serves also as a handle for holding and positioning the guide disc 34.

The auxiliary chuck or coupling 16 preferably comprises a round bar 64 of substantial diameter which is provided with a drilled axial bore 66 which closely receives the outer or forward end of the extension shaft 14, in one end thereof, and the hole saw stem 20 in its other end. Pairs of opposed set-screws 68 and 70 are threaded through the bar 64, at related ends thereof, and severally engage the shaft 14 and the stem 20 and hold them securely and non-rotatably in the coupling bore 66.

As indicated in FIGURES 4 and 5, the holes 22 and 24 are drilled, with assurance of their accurate alignment with each other, by applying the hole saw 18 upwardly against the underside of the lower overhang panel 26 and rotating the same until the lower or first hole 22 has been made, whereupon the extension guide 32 is moved manually up along the extension shaft 14 and the disc 34 engaged upwardly in the first hole 22, with its stop flange 42 engaged with the underside of the panel 26. Thereupon the cam screws 48 are rotated so as to make threaded and cam engagement with the edge 52 of the hole 22, so that the guide 32 becomes self-supporting in the hole 22. The extension shaft 14 and the hole saw 18 are then moved upwardly, relative to the guide 32, by elevating the drill 10, and the hole saw 48 is applied to the upper overhang panel 28 to form the second or upper hole 24 therein.

Removal of the drill assembly and the guide 32 involves merely rotating the cam screws 48, as by insertion of a screwdriver in their heads 50, to put their flats 54 outwardly, and letting the guide 32 fall out of the lower hole 22, to be followed by the hole saw 18.

A portion of the stop flange 42 is removed, as at 72, to permit closer positioning of the disc 34 with respect to building walls and other obstructions.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a drill having a shaft having an enlarged diameter boring element thereon, a guide slidably and rotatably circumposed on said shaft, said guide comprising a disc of substantially the same diameter as said boring element, said disc being adapted to be moved along the shaft and engaged in a first hole made with said boring element while a second hole is being made with said boring element, in line with and at a distance from the first hole, and means for releasably securing said disc in a hole made with the boring element.

2. In combination, a drill having a shaft having an enlarged diameter boring element thereon, a guide slidably and rotatably circumposed on said shaft, said guide comprising a disc of substantially the same diameter as said boring element, said disc being adapted to be moved along the shaft and engaged in a first hole made with said boring element while a second hole is being made with said boring element, in line with and at a distance from the first hole, and means for releasably securing said disc in a hole made with the boring element, said disc having a peripheral edge, said securing means comprising cam means on the disc extensible beyond said peripheral edge to forcible engagement with the edge of a hole.

3. In combination, a portable drill having a chuck, an extension shaft having a first end engaged in said chuck and a second end, a coupling on said second end of the shaft, a boring element larger in diameter than said shaft and engaged in the coupling, a guide slidably and rotatably circumposed on said extension shaft and movable thereon between the drill chuck and said coupling, said guide comprising a disc of substantially the same diameter as said boring element, said disc being adapted to be engaged in a first hole made with said boring element while the boring element is applied to bore a second hole at a location spaced from the first hole, said disc having a lateral stop flange, said guide further comprising a guide sleeve slidably and rotatably engaged on the extension shaft, said guide sleeve being shorter than the extension shaft and movable therealong between the drill chuck and said coupling.

4. In combination, a portable drill having a chuck, an extension shaft having a first end engaged in said chuck and a second end, a coupling on said second end of the shaft, a boring element larger in diameter than said shaft and engaged in the coupling, a guide slidably and rotatably circumposed on said extension shaft and movable thereon between the drill chuck and said coupling, said guide comprising a disc of substantially the same diameter as said boring element, said disc being adapted to be engaged in a first hole made with said boring element while the boring element is applied to bore a second hole at a location spaced from the first hole, said disc having a lateral stop flange, said guide further comprising a guide sleeve slidably and rotatably engaged on the extension shaft, said guide sleeve being shorter than the extension shaft and movable therealong between the drill chuck and said coupling, and means for releasably securing said disc in a hole made with the boring element.

5. In combination, a portable drill having a chuck, an extension shaft having a first end engaged in said chuck and a second end, a coupling on said second end of the shaft, a boring element larger in diameter than said shaft and engaged in the coupling, a guide slidably and rotatably circumposed on said extension shaft and movable thereon between the drill chuck and said coupling, said guide comprising a disc of substantially the same diameter as said boring element, said disc being adapted to be engaged in a first hole made with said boring element while the boring element is applied to bore a second hole at a location spaced from the first hole, said disc having a lateral stop flange, said guide further comprising a guide sleeve slidably and rotatably engaged on the extension shaft, said guide sleeve being shorter than the extension shaft and movable therealong between the drill chuck and said coupling, and means for releasably securing said disc in a hole made with the boring element, comprising elements on the disc extensible beyond the peripheral edge of the disc.

6. In combination, a drill having a shaft having an enlarged diameter boring element thereon, a guide slidably and rotatably circumposed on said shaft, said guide comprising a disc of substantially the same diameter as said boring element, said disc being adapted to be moved along the shaft and engaged in the first hole made with said boring element while a second hole is being made with said boring element, in line with and at a distance from the first hole, and means for releasably securing said disc in a hole made with the boring element, comprising rotary cams positioned in half-bores indenting the peripheral edge of the disc, said cams having flats adapted to be positioned flush with said peripheral edge and rounds adapted to be positioned outwardly of the peripheral edge.

7. In combination, a drill having a shaft having an enlarged diameter boring element thereon, a guide slidably and rotatably circumposed on said shaft, said guide comprising a disc of substantially the same diameter as said boring element, said disc being adapted to be moved along the shaft and engaged in a first hole made with said boring element while a second hole is being made with said boring element, in line with and at a distance from the first hole, and means for releasably securing said disc in a hole made with the boring element, comprising full bores and half-bores in extension of said full bores, said half-bores opening through the peripheral edge of the disc, and cam screws threaded in said full bores and half-bores, said screws having flats adapted to be positioned flush with said peripheral edge and rounds adapted to be positioned outwardly of the peripheral edge.

References Cited in the file of this patent
UNITED STATES PATENTS 1,408,802   Crocker et al. _____ Mar. 7, 1922